(12) United States Patent  
Kobayashi

(10) Patent No.: US 8,645,608 B2  
(45) Date of Patent: Feb. 4, 2014

(54) ELECTRONIC DEVICE THAT INCLUDES RANKED CONTROL UNITS THAT ARE CONNECTED TOGETHER AND CONTROL METHOD THEREOF

(75) Inventor: Hidenori Kobayashi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 296 days.

(21) Appl. No.: 13/171,394

(22) Filed: Jun. 28, 2011

(65) Prior Publication Data

US 2012/0005398 A1     Jan. 5, 2012

Related U.S. Application Data

(60) Provisional application No. 61/360,446, filed on Jun. 30, 2010, provisional application No. 61/360,471, filed on Jun. 30, 2010.

(51) Int. Cl.
*G06F 13/36*     (2006.01)
*G06F 13/40*     (2006.01)

(52) U.S. Cl.
CPC .............................. *G06F 13/4022* (2013.01)
USPC ........................................ 710/316; 710/309

(58) Field of Classification Search
USPC ..................... 710/300–317, 8–19, 104–110
See application file for complete search history.

(56) References Cited

U.S. PATENT DOCUMENTS

| | | | |
|---|---|---|---|
| 6,725,323 B2 | 4/2004 | Katahira | |
| 7,346,717 B2 * | 3/2008 | Isemura et al. | 710/104 |
| 7,603,501 B2 * | 10/2009 | Hsieh et al. | 710/110 |
| 7,747,804 B2 * | 6/2010 | Wang | 710/110 |
| 8,234,436 B2 * | 7/2012 | Chu | 710/313 |
| 8,239,602 B2 * | 8/2012 | Gutekunst et al. | 710/305 |

FOREIGN PATENT DOCUMENTS

JP     2002-366204 A     12/2002

* cited by examiner

*Primary Examiner* — Raymond Phan
(74) *Attorney, Agent, or Firm* — Patterson & Sheridan LLP

(57) ABSTRACT

According to one embodiment, an electronic device forming a first communication path which couples a first interface of a high-rank unit and a second interface of a mid-rank unit and a second communication path which couples a third interface of the mid-rank unit and a fourth interface of a low-rank unit, while cutting off a third communication path which couples the first interface and the fourth interface, in an ordinary state. When data needs to be write from the high-rank unit to the low-rank unit, the electronic device forming the third communication path and cutting off the first communication path and the second communication path.

15 Claims, 7 Drawing Sheets

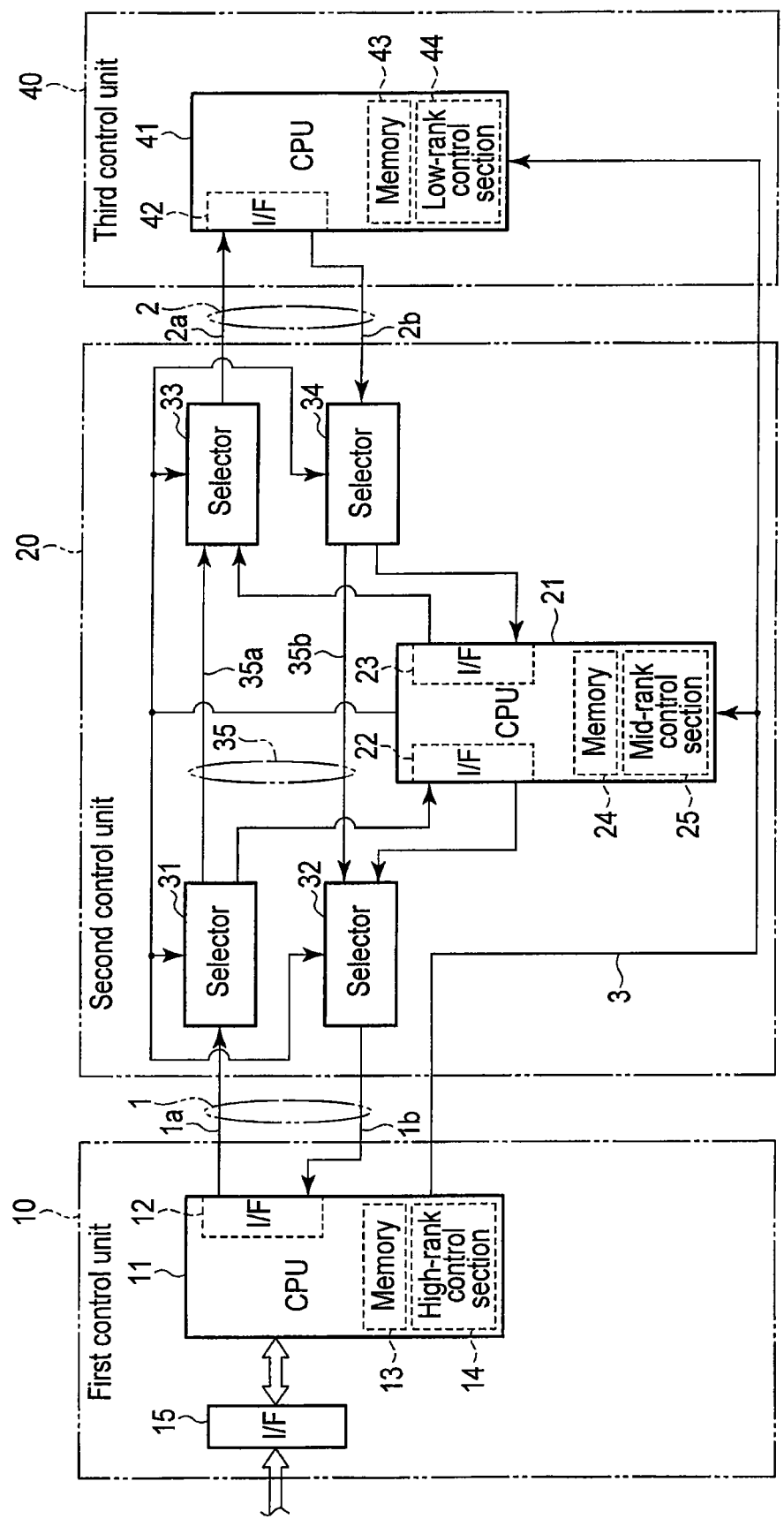
F I G. 1

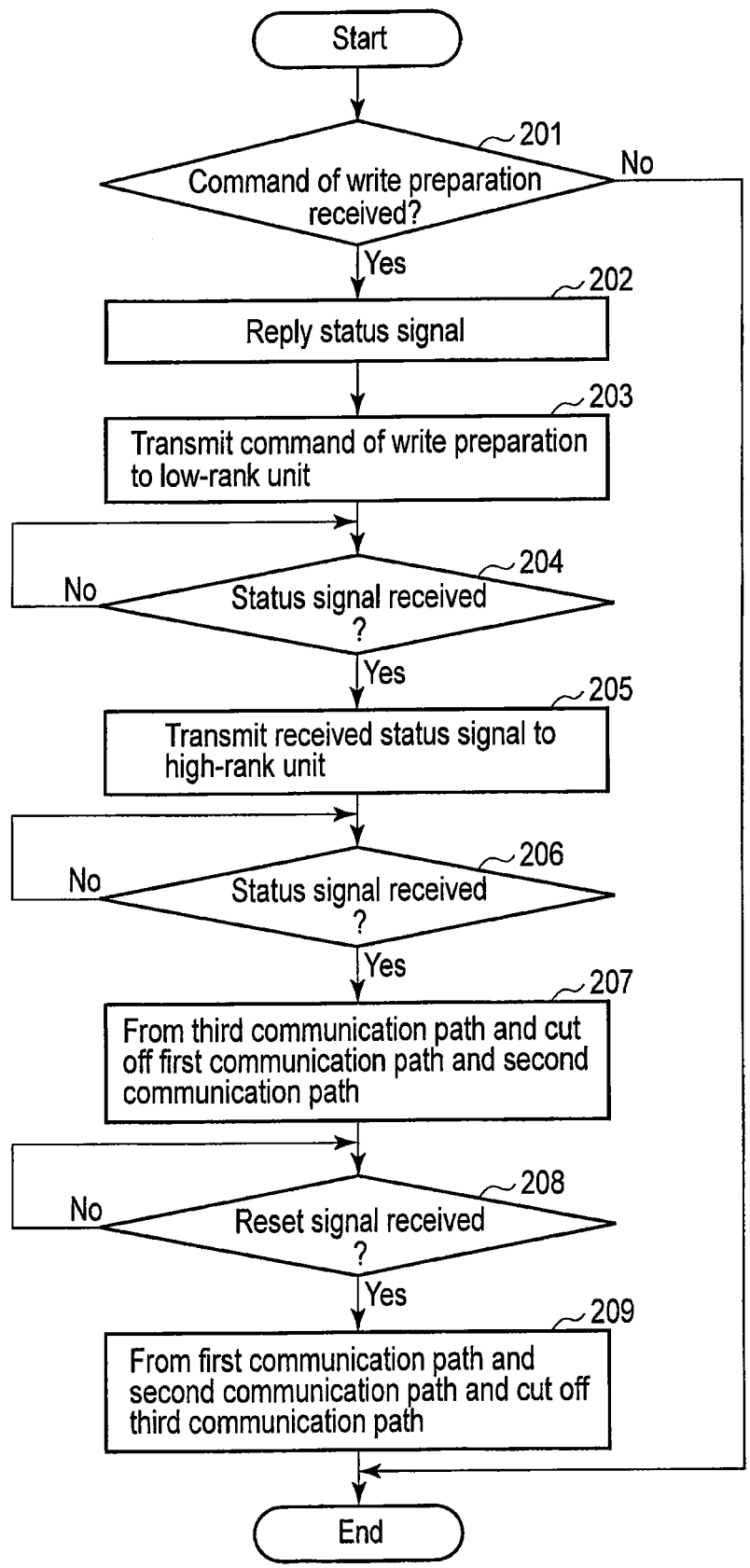
F I G. 3

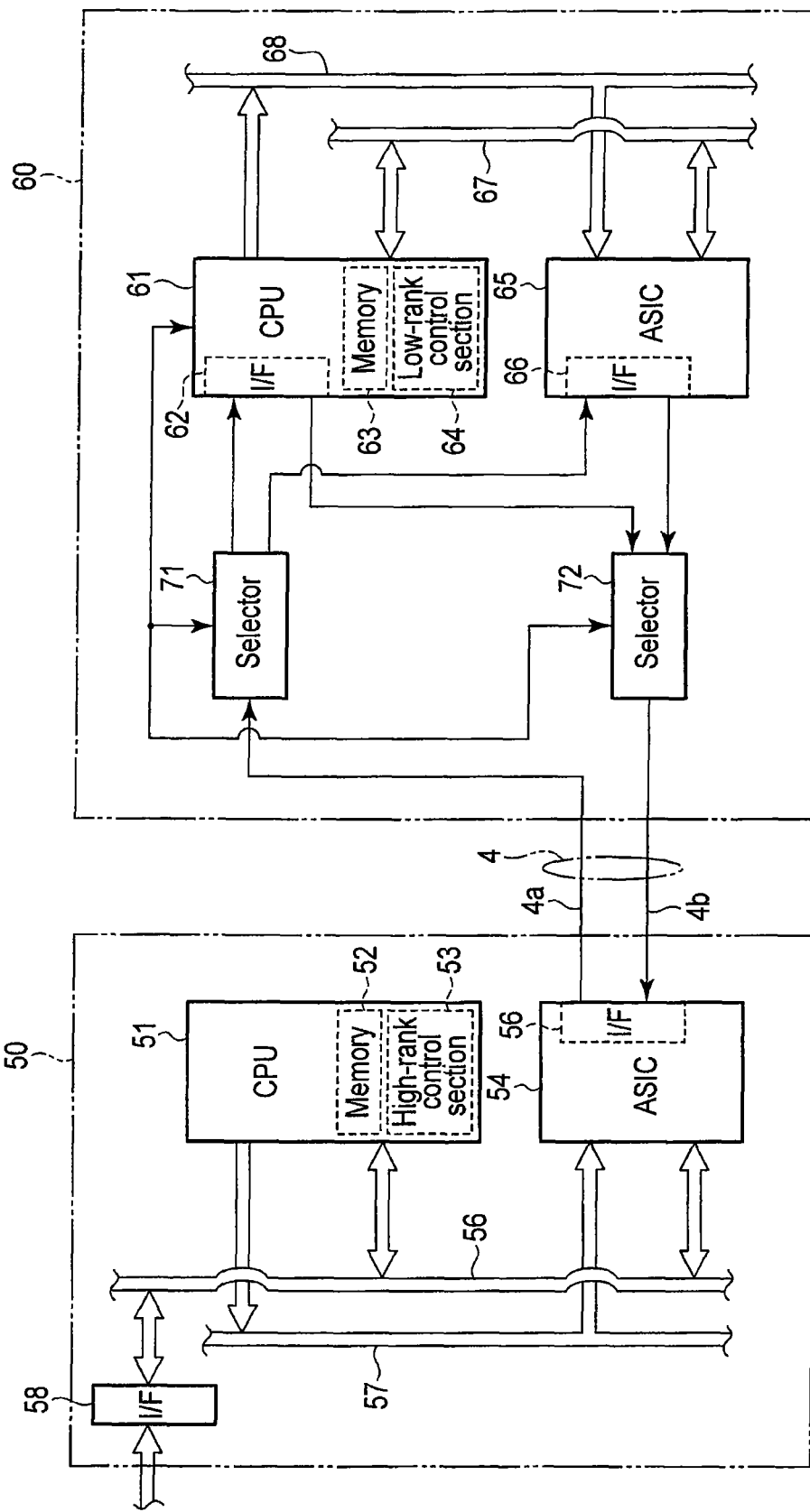
F I G. 5

ELECTRONIC DEVICE THAT INCLUDES RANKED CONTROL UNITS THAT ARE CONNECTED TOGETHER AND CONTROL METHOD THEREOF

CROSS-REFERENCE TO RELATED APPLICATIONS

This application is based upon and claims the benefit of priority from U.S. Provisional Application No. 61/360,446, filed on Jun. 30, 2010, and No. 61/360,471, filed on Jun. 30, 2010, the entire contents of which are incorporated herein by reference.

FIELD

Embodiments described herein relate generally to an electronic device including a plurality of control units and a control method thereof.

BACKGROUND

In an electronic device having a configuration that includes a plurality of control units and serially connects the control units in order of predetermined ranks, when program data in a low-rank control unit is updated, new program data is transmitted from a high-rank control unit to the low-rank control unit.

In the electronic device, it is requested to reduce the time required for transmitting the program data.

BRIEF DESCRIPTION OF THE DRAWINGS

FIG. 1 is a block diagram showing the configuration of a first embodiment.

FIG. 3 is a flowchart showing control of a mid-rank unit in the first embodiment.

FIG. 5 is a block diagram showing the configuration of a second embodiment.

DETAILED DESCRIPTION

Figure 2:
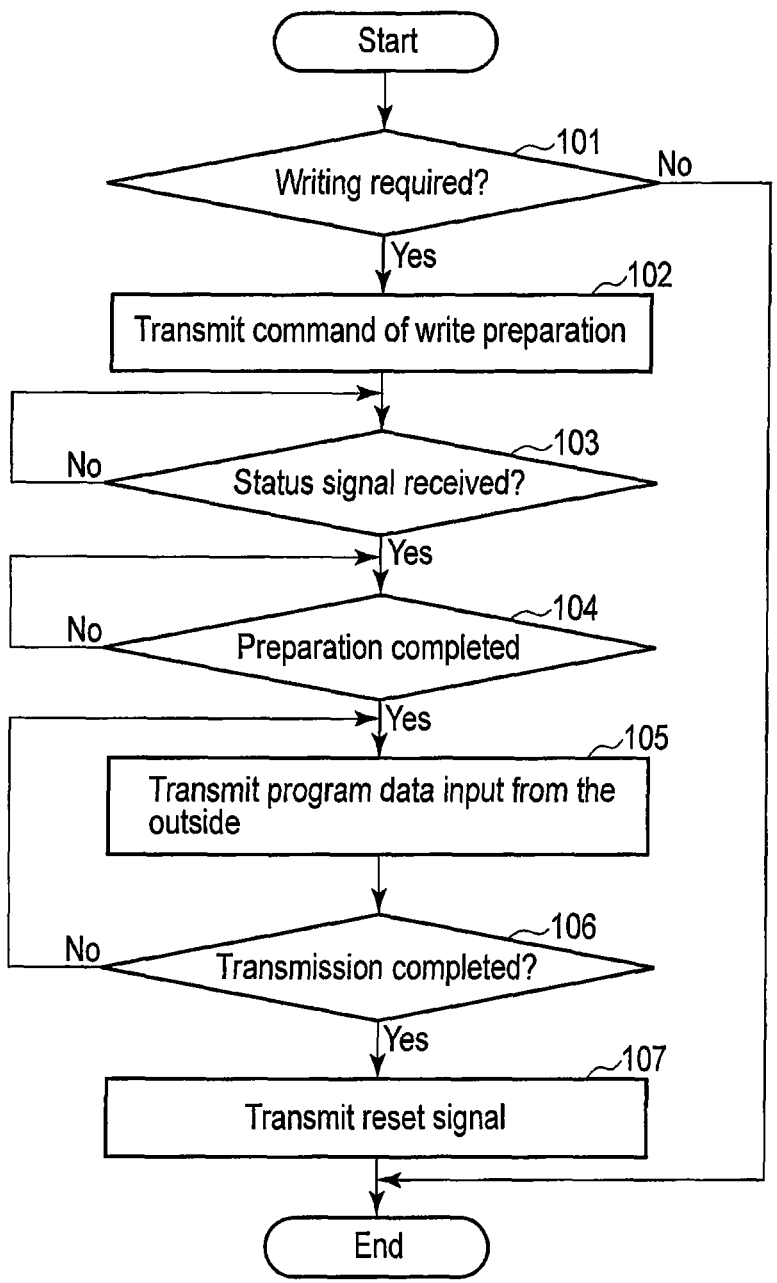
FIG. 2 is a flowchart showing control of a high-rank unit in the first embodiment.

In general, according to one embodiment, an electronic device includes: a high-rank unit, a mid-rank unit, and a low-rank unit are serially connected in sequence; a first interface for data communication arranged in the high-rank unit; second and third interfaces for data communication arranged in the mid-rank unit; a fourth interface for data communication arranged in the low-rank unit; a selector arranged in the mid-rank unit and configured to selectively form a first communication path which couples the first interface and the second interface, a second communication path which couples the third interface and the fourth interface, and a third communication path which couples the first interface and the fourth interface; and a mid-rank control section arranged in the mid-rank unit, configured to form the first communication path and the second communication path of the selector and cut off the third communication path of the selector in an ordinary state, and configured to form the third communication path of the selector and cut off the first communication path and the second communication path of the selector when data needs to be write from the high-rank unit to the low-rank unit.

[1] A first embodiment is described.

An electronic device, as shown in FIG. 1, includes a high-rank unit 10, a mid-rank unit 20, and a low-rank unit 40, which have a high-rank and low-rank relationship with each other. The high-rank unit 10, the mid-rank unit 20, and the low-rank unit 40 are serially connected in sequence through a serial signal line 1 and a serial signal line 2. The serial signal line 1 includes a pair of lines 1a and 1b. The serial signal line 2 includes a pair of lines 2a and 2b. A reset signal line 3 is connected among the high-rank unit 10, the mid-rank unit 20, and the low-rank unit 40.

A CPU 11 and an external interface 15 are arranged in the high-rank unit 10. The CPU 11 includes a first serial interface 12 for serial data communication, a memory (for example, an FROM) 13, and a high-rank control section 14, and performs various unique processes on the high-rank unit 10 on the basis of a control program and an application program in the memory 13.

A CPU 21, selectors 31, 32, 33, and 34, and a serial signal line 35 are arranged in the mid-rank unit 20. The CPU 21 includes a second serial interface 22 for serial data communication, a third serial interface 23 for serial data communication, a memory (for example, an FROM) 24, and a mid-rank control section 25, and performs various unique processes on the mid-rank unit 20 on the basis of a control program and an application program in the memory 24.

A CPU 41 is arranged in the low-rank unit 40. The CPU 41 includes a fourth serial interface 42 for serial data communication, a memory (for example, an FROM) 43, and a low-rank control section 44, and performs various unique processes on the low-rank unit 40 on the basis of a control program and an application program in the memory 43.

The high-rank control section 14 of the high-rank unit 10 has the following functions (1) to (3).

(1) A function of transmitting a write preparation command to the mid-rank unit 20 through the first serial interface 12 and a first communication path, when data to be write in the low-rank unit 40 is input from the outside through an external interface 15.

(2) A function of transmitting input data to the mid-rank unit 20 through the first serial interface 12 and a third communication path, when receiving a status signal of preparation completion transmitted from the mid-rank unit 20, through the first serial interface 12 and a third communication path. The input data is temporarily stored in the memory 13.

(3) A function of transmitting a reset signal to the mid-rank unit 20 and the low-rank unit 40 through a reset signal line 3, when the above transmission is completed.

The selectors 31, 32, 33, and 34 of the mid-unit 20 selectively form the first communication path which couples the first serial interface 12 of the high-rank unit 10 and the second serial interface 22 of the mid-rank unit 20, a second communication path which couples the third serial interface 23 of the mid-rank unit 20 and the fourth serial interface 42 of the low-rank unit 40, and the third communication path which couples the first serial interface 12 of the high-rank unit 10 and the fourth serial interface 42 of the low-rank unit 40 through the serial signal line 35, in response to orders from the mid-rank control section 25. The serial signal line 35 includes a pair of lines 35a and 35b.

The mid-rank control section 25 of the mid-rank unit 20 has the following functions (11) to (15).

(11) A function of forming the first communication path and the second communication path and cutting off the third communication path of the selectors 31, 32, 33, and 34, in an ordinary state.

(12) A function of transmitting a write preparation command to the low-rank unit 40 through the third serial interface 23 and the second communication path, when receiving the write preparation command, which is transmitted from the high-rank unit 10, through the first communication path and the second serial interface 22.

(13) A function of transmitting a signal of preparation completion to the high-rank unit 10 through the second serial interface 22 and the first communication path, when receiving a status signal of preparation completion, which is transmitted from the low-rank unit 40 through the second communication path and the third serial interface 23.

(14) A function of forming the third communication path and cutting off the first communication path and the second communication path after the transmission.

(15) A function of forming the first communication path and the second communication path and cutting off the third communication path, when receiving a reset signal from the high-rank unit 10.

The low-rank control section of the low-rank unit 40 has the following functions (21) to (24).

(21) A function of setting a data write mode, when receiving a command of the write preparation through the second communication path and the fourth serial interface 42.

(23) A function of transmitting the status signal of preparation completion to the mid-rank unit 20 through the fourth serial interface 42 and the second communication path, when the setting is completed.

(23) A function of receiving data transmitted from the high-rank unit 10 through the third communication path and the fourth serial interface 42, and updating and storing the data in the memory 43, with the data write mode set.

(24) A function of deactivating the data write mode, when receiving a reset signal from the low-rank unit 10.

Figure 4:
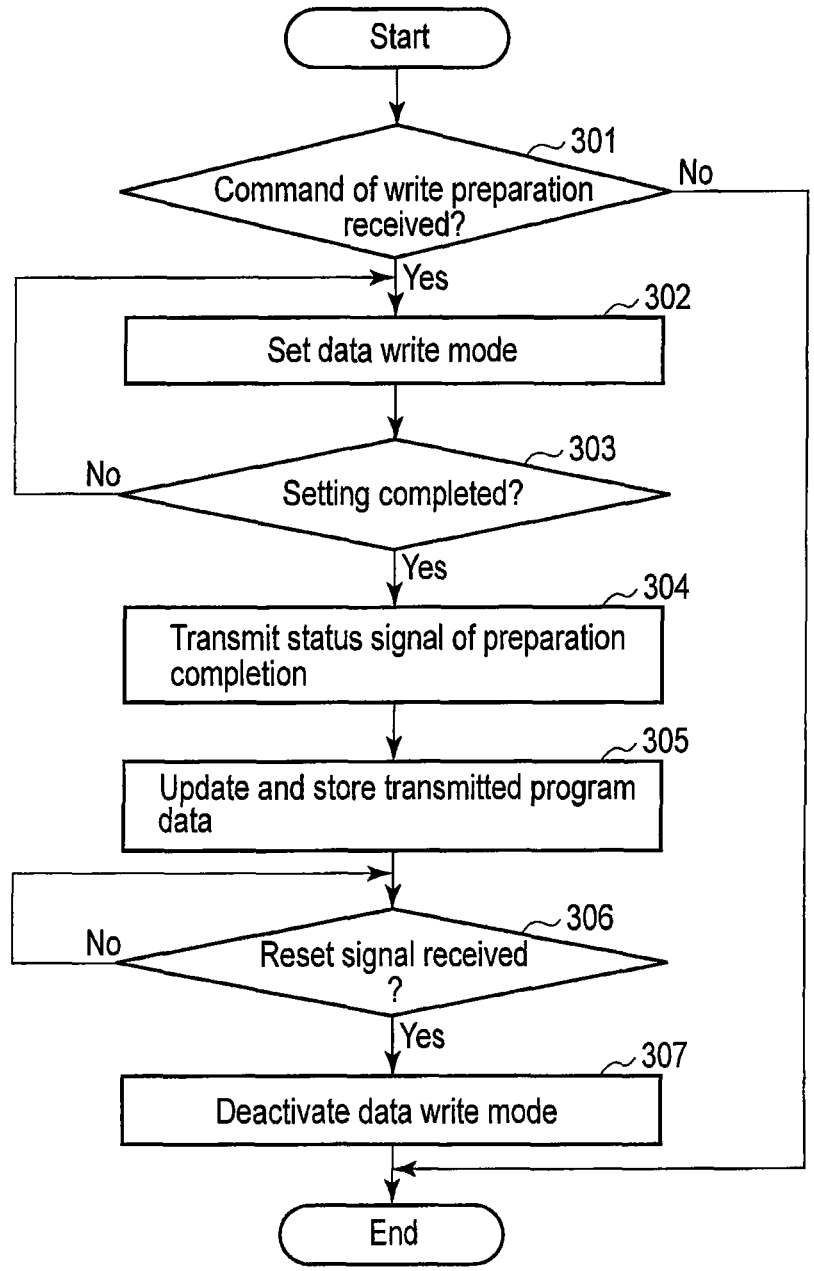
FIG. 4 is a flowchart showing control of a low-rank unit in the first embodiment.

Control of the high-rank control section 14 is shown in FIG. 2, control of the mid-rank control section 25 is shown in FIG. 3, and control of the low-rank control section 44 is shown in FIG. 4.

First, when data to be write in the low-rank unit 40, for example, program data is input from the outside through the external interface 15, the high-rank control section 14 transmits a command of write preparation to the mid-rank unit 20 through the first serial interface 12 and the first communication path (Act 102), under the determination that it is required to write data in the low-rank unit 40 (YES in Act 101). The high-rank control section 14 waits a status signal of preparation completion (Act 104), when receiving a status signal replied from the mid-rank unit 20 (YES in Act 103). When receiving a status signal of preparation completion transmitted from the mid-rank unit 20, through the first communication path and the first serial interface 12 (YES in Act 104), the high-rank control section 14 transmits the input program data (serial data transmission) to the mid-rank unit 20 through the first serial interface 12 and the third communication path (Act 105). The high-rank control section 14 transmits a reset signal to the mid-rank unit 20 and the low-rank unit 40 through the reset signal line 3 (Act 107), when the transmission of the input program data is completed (YES in Act 106).

On the other hand, when receiving a command of write preparation transmitted from the high-rank unit 10, through the first communication path and the second serial interface 22 (YES in Act 201), the mid-rank control section 25 transmits the received command of write preparation to the low-rank unit 40 through the third serial interface 23 and the second communication path (Act 203) while replying the status signal to the high-rank unit 10 (Act 202). When receiving a status signal of preparation completion transmitted from the low-rank unit 40, through the second communication path and the third serial interface 23 (YES in Act 204), the mid-rank control section 25 transmits the status signal of preparation completion to the high-rank unit 10 through the second serial interface 22 and the first communication path (Act 205). When receiving the status signal replied from the high-rank unit 10 (YES in Act 206), the mid-rank control section 25 forms the third communication path and cuts off the first communication path and the second communication path (Act 207). When receiving a reset signal from the high-rank unit 10 (YES in Act 208), the mid-rank control section 25 forms the first communication path and the second communication path and cuts off the third communication path (Act 209).

Further, when receiving a command of write preparation through the second communication path and the fourth serial interface 42 (YES in Act 301), the low-rank control section 44 sets a data write mode (Act 302). The low-rank control section 44 transmits the status signal of preparation completion to the mid-rank unit 20 through the fourth serial interface 42 and the second communication path (Act 304), when the setting is completed (YES in Act 303). The low-rank control section 44 receives program data transmitted from the high-rank unit 10, through the third communication path and the fourth serial interface 42, and updates and stores the program data in the memory 43 (Act 305). When receiving a reset signal from the low-rank unit 10 (YES in Act 306), the low-rank control section 44 deactivates the data write mode (Act 307).

As described above, when it is required to write data from the high-rank unit 10 to the low-rank unit 40, the data is directly transmitted through the third communication path in the mid-rank unit 20, such that it is possible to considerably reduce the time required for transmitting the data.

[2] A second embodiment is described.

An electronic device, as shown in FIG. 5, includes a high-rank unit 50 and a low-rank unit 60 which have a high-rank and low-rank relationship with each other. The high-rank unit 50 and the low-rank unit 60 are serially connected in sequence through a serial signal line 4. The serial signal line 4 includes a pair of lines 4a and 4b.

A CPU 51, an ASIC (Application Specific Integrated Circuit) 54, a data bus 56, an address bus 57, and an external interface 58 are arranged in the high-rank unit 50. The CPU 51 includes a memory 52 and a high-rank control section 53 and performs various unique processes on the high-rank unit 50 on the basis of a control program and an application program in the memory 52. The ASIC 54 includes a first serial interface 55 that allows switching between an ordinary specification adapting to a command & status communication and a specification adapting to high-speed serial data communication. As the specification adapting to the high-speed serial data communication, for example, customizing, such as use of FIFO (first-in•first-out) or speeding-up of baud rate, is exemplified.

A CPU 61, an ASIC 65, a data bus 67, an address bus 68, and selectors 71 and 72 are arranged in the low-rank unit 60. The CPU 61 includes a second serial interface 62 for serial data communication, a memory 63, and a low-rank control section 64, and performs various unique processes on the low-rank unit 60 on the basis of a control program and an application program in the memory 63. The ASIC 65 includes a third serial interface 66 having a specification adapting to high-speed serial data communication. As the specification adapting to the high-speed serial data communication, for example, customizing, such as use of FIFO (first-in•first-out) or speeding-up of baud rate, is exemplified.

The high-rank control section 53 of the high-rank unit 50 has the following functions (1) to (3).

(1) A function of transmitting a write preparation command to the low-rank unit 60 through the first serial interface 55 and a first communication path, when data to be write in the low-rank unit 60 is input from the outside through an external interface 58. The input data is temporarily stored in the memory 63.

(2) A function of transmitting the input data to the low-rank unit 60 through the first serial interface 55 and a second communication path, when receiving a status signal of preparation completion transmitted from the low-rank unit 60, through the first communication path and the first serial interface 55.

(3) A function of transmitting a reset signal to the low-rank unit 60 through the first serial interface 55 and the second communication path, when the above transmission is completed.

The selectors 71 and 72 of the low-rank unit 60 selectively form a first communication path which couples the first serial interface 55 of the high-rank unit 50 and the second serial interface 62 of the low-rank unit 60, and a second communication path which couples the first serial interface 55 of the high-rank unit 50 and the third serial interface 66 of the low-rank unit 60, in accordance with orders from the low-rank control section 64.

The low-rank control section 64 of the low-rank unit 60 has the following functions (11) to (16).

(11) A function of forming the first communication path and cutting off the second communication path of the selectors 71 and 72, in an ordinary state.

(12) A function of setting a data write mode, when receiving a command of the write preparation through the second serial interface 62 and the first communication path.

(13) A function of transmitting the status signal of preparation completion to the high-rank unit 50 through the second serial interface 62 and the first communication path, when the setting is completed.

(14) A function of forming the second communication path and cutting off the first communication path of the selectors 71 and 72, after the transmission.

(15) A function of receiving data transmitted from the high-rank unit 50 through the second communication path and the third serial interface 66, and updating and storing the data in the memory 63, with the data write mode set.

(16) A function of forming the first communication path and cutting off the second communication path of the selectors 71 and 72, when receiving a reset signal from the high-rank unit 50.

Figure 6:
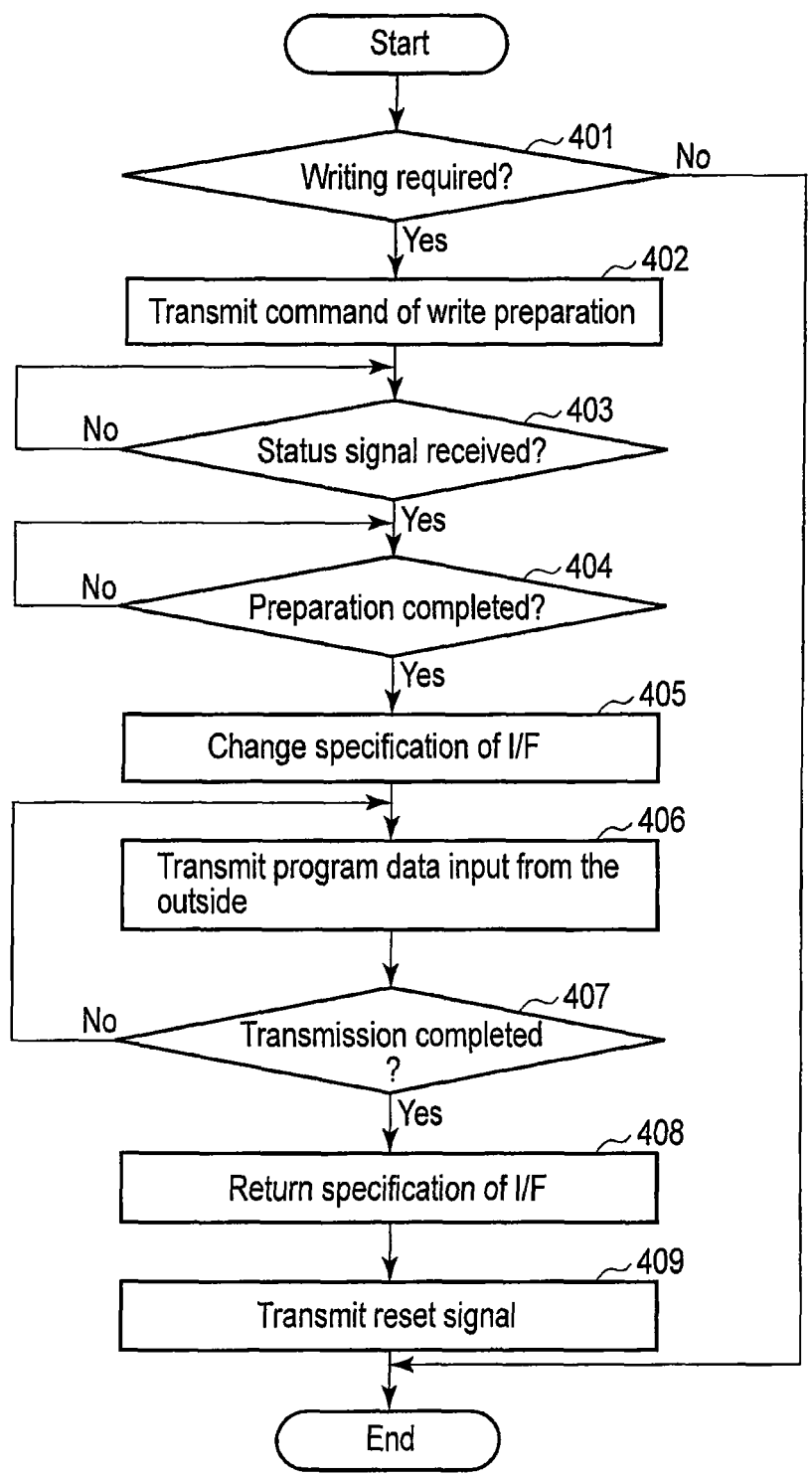
FIG. 6 is a flowchart showing control of a high-rank unit in the second embodiment.
Figure 7:
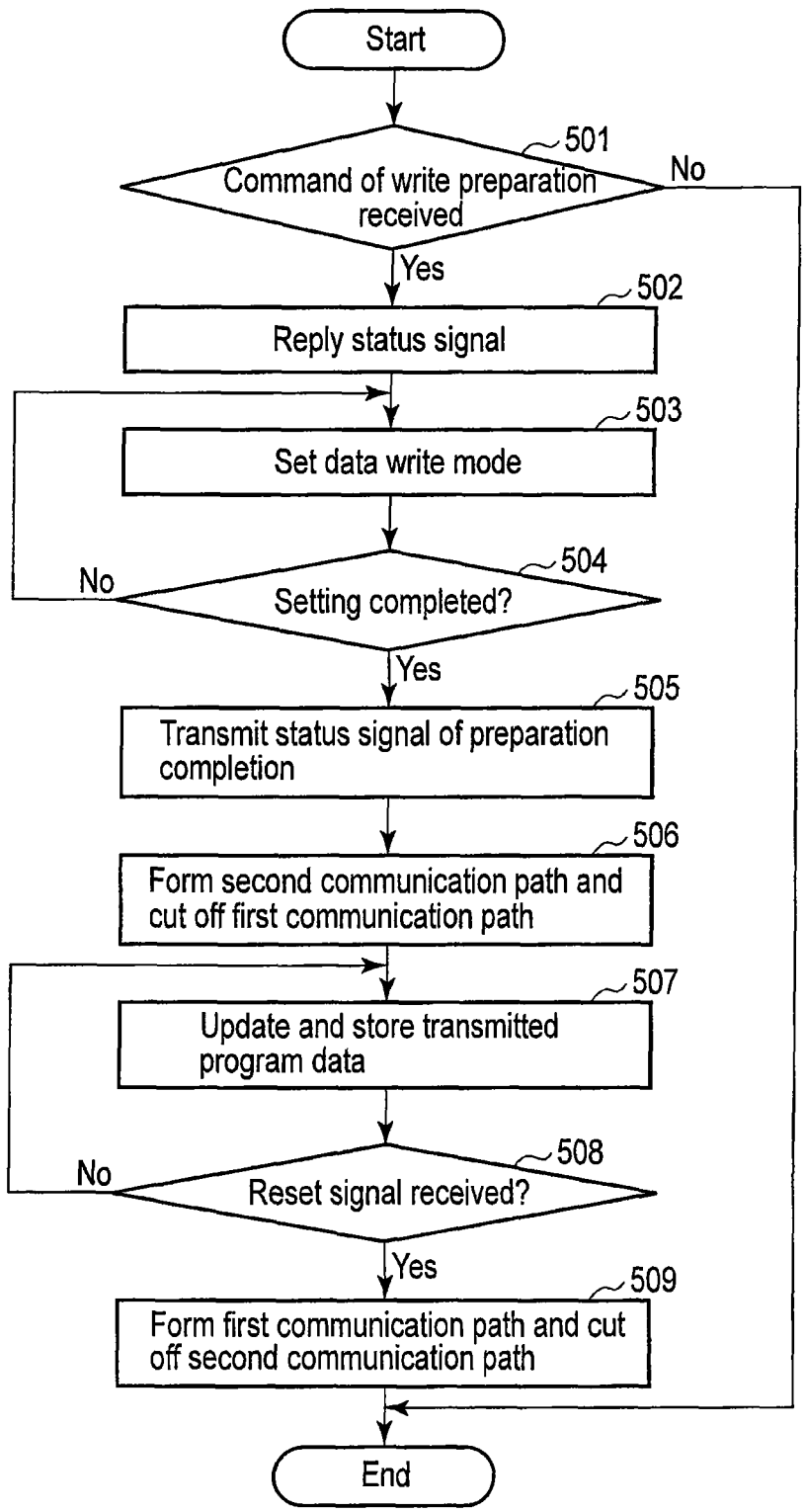
FIG. 7 is a flowchart showing control of a low-rank unit in the second embodiment.

Control of the high-rank control section 53 is shown in FIG. 6, and control of the low-rank control section 64 is shown in FIG. 7.

First, when data to be write in the low-rank unit 60, for example, program data is input from the outside through the external interface 58, the high-rank control section 53 transmits a command of write preparation to the low-rank unit 60 through the first serial interface 55 and the first communication path (Act 402), under the determination that it is required to write data in the low-rank unit 60 (YES in Act 401). The high-rank control section 53 waits a status signal of preparation completion (Act 404), when receiving a status signal replied from the low-rank unit 60 (YES in Act 403). When receiving a status signal of preparation completion transmitted from the low-rank unit 60, through the first communication path and the first serial interface 55 (YES in Act 404), the high-rank control section 53 transmits the input program data (serial data transmission) to the low-rank unit 60 through the first serial interface 55 and the second communication path (Act 406) while changing the specification of the first serial interface 55 into a specification (set content) corresponding to the high-speed serial data communication (Act 405). The high-rank control section 53 transmits a reset signal to the low-rank unit 60 through the first serial interface 55 and the second communication path (Act 409) while returning the specification of the first serial interface 55 into the ordinary specification (set content) for command & status communication (Act 408), when the transmission of the program data is completed (YES in Act 407).

On the other hand, when receiving the command of write preparation through the second serial interface 62 and the first communication path (YES in Act 501), the low-rank control section 64 sets a data write mode (Act 503) while replying the status signal to the high-rank unit 50 (Act 502). The low-rank control section 64 transmits the status signal of preparation completion to the high-rank unit 50 through the second serial interface 62 and the first communication path (Act 505), when the setting of the data write mode is completed (YES in Act 504). The low-rank control section 64 forms the second communication path and cuts off the first communication path of the selectors 71 and 72, after the status signal of preparation completion is transmitted (Act 506). The low-rank control section 64 receives data transmitted from the high-rank unit 50, through the second communication path and the third serial interface 66, and updates and stores the data in the memory 63 (Act 507). When receiving a reset signal from the high-rank unit 50 (YES in Act 508), the low-rank control section 64 forms the first communication path and cuts off the second communication path of the selectors 71 and 72 (Act 509).

As described above, when it is required to write data from the high-rank unit 50 to the low-rank unit 60, the data is transmitted to the low-rank unit 60 through the third serial interface 66 having the specification adapting to the high-speed serial data communication in the ASIC 65 of the low-rank unit 60, such that it is possible to considerably reduce the time required for transmitting the data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a high-rank unit, a mid-rank unit, and a low-rank unit serially connected in sequence;
a first interface for data communication arranged in the high-rank unit;
second and third interfaces for data communication arranged in the mid-rank unit;
a fourth interface for data communication arranged in the low-rank unit;
a selector arranged in the mid-rank unit and configured to selectively form a first communication path which couples the first interface and the second interface, a second communication path which couples the third interface and the fourth interface, and a third communication path which couples the first interface and the fourth interface;

a mid-rank control section arranged in the mid-rank unit, configured to form the first communication path and the second communication path of the selector and cut off the third communication path of the selector in an ordinary state, and configured to form the third communication path of the selector and cut off the first communication path and the second communication path of the selector when data needs to be written from the high-rank unit to the low-rank unit; and a high-rank control section arranged in the high-rank unit, configured to transmit a write preparation command to the mid-rank unit through the first interface when data to be written in the low-rank unit is input to an external interface of the electronic device, and configured to transmit said input data to the mid-rank unit through the first interface in response to receiving a status signal indicating completion of write preparation transmitted from the mid-rank unit through the first interface.

2. The electronic device of claim 1,
wherein the first, second, third, and fourth interfaces are serial interfaces for serial data communication.

3. The electronic device of claim 1,
wherein the mid-rank control section transmits the write preparation command to the low-rank unit through the third interface when receiving the write preparation command through the second interface, transmits the status signal indicating completion of write preparation to the high-rank unit through the second interface when receiving the status signal indicating completion of write preparation transmitted from the low-rank unit through the third interface, and forms the third communication path of the selector and cuts off the first communication path and the second communication path of the selector after the transmission.

4. The electronic device of claim 1,
wherein the selector is a plurality of selectors.

5. The electronic device of claim 3, further comprising:
a low-rank control section arranged in the low-rank unit, configured to set a data write mode when receiving the write preparation command through the fourth interface, and configured to receive and write the data transmitted from the high-rank unit through the fourth interface while transmitting the status signal indicating completion of write preparation to the mid-rank unit through the fourth interface, when the setting is completed.

6. The electronic device of claim 5, further comprising:
a CPU arranged in the high-rank unit and including a memory which stores the input data while including the first interface and the high-rank control section;
a CPU arranged in the mid-rank unit and including the second interface, the third interface, and the mid-rank control section; and
a CPU arranged in the low-rank unit and including a memory which stores data transmitted from the high-rank control section while including the fourth interface and the low-rank control section.

7. The electronic device of claim 5, further comprising:
a reset signal line connected among the high-rank unit, the mid-rank unit, and the low-rank unit.

8. The electronic device of claim 7,
wherein the high-rank control section transmits a reset signal to the mid-rank unit and the low-rank unit through the reset signal line, when the transmission of the input data is completed,
the mid-rank control section forms the first communication path and the second communication path of the selector and cuts off the third communication path of the selector, when receiving the reset signal, and
the low-rank control section deactivates the data write mode when receiving the reset signal.

9. An electronic device comprising:
a high-rank unit and a low-rank unit serially connected in sequence;
a first interface for data communication arranged in the high-rank unit;
second and third interfaces for data communication arranged in the low-rank unit;
a selector arranged in the low-rank unit and configured to selectively form a first communication path which couples the first interface and the second interface and a second communication path which couples the first interface and the third interface;
a low-rank control section arranged in the low-rank unit, configured to form the first communication path of the selector and cut off the second communication path of the selector in an ordinary state, and configured to form the second communication path and cut off the first communication path of the selector when data needs to be written from the high-rank unit to the low-rank unit; and
a high-rank control section arranged in the high-rank unit, and configured to transmit a write preparation command to the low-rank unit through the first interface when data to be written in the low-rank unit is input to an external interface of the electronic device, and configured to transmit said input data to the low-rank unit through the first interface in response to receiving a status signal indicating completion of write preparation transmitted from the low-rank unit through the first interface.

10. The electronic device of claim 9,
wherein the first, second, and third interfaces are serial interfaces for serial data communication.

11. The electronic device of claim 9
wherein the low-rank control section sets a data write mode when receiving the write preparation command through the second interface, transmits the status signal indicating completion of write preparation to the high-rank unit through the second interface when the setting is completed, forms the second communication path of the selector and cut off the first communication path of the selector after the transmission, receives the data transmitted from the high-rank unit through the third interface, and updates and stores the data.

12. The electronic device of claim 9,
wherein the selector is a plurality of the selectors.

13. The electronic device of claim 9,
wherein the high-rank control section transmits a reset signal to the low-rank unit through the first interface when the transmission of the input data is completed, and
the low-rank control section forms the first communication path of the selector and cuts off the second communication path of the selector when receiving the reset signal through the third interface.

14. The electronic device of claim 11, further comprising:
- a CPU arranged in the high-rank unit and including a memory storing the input data while including the high-rank control section;
- an ASIC arranged in the high-rank unit and including the first interface;
- a CPU arranged in the low-rank unit and including a memory storing the data transmitted from the high-rank control section while including the second interface and the low-rank control section; and
- an ASIC arranged in the low-rank unit and including the third interface.

15. A control method of an electronic device which includes: a high-rank unit, a mid-rank unit, and a low-rank unit serially connected in sequence; a first interface for data communication arranged in the high-rank unit; second and third interfaces for data communication arranged in the mid-rank unit; and a fourth interface for data communication arranged in the low-rank unit, the method comprising:
- forming a first communication path which couples the first interface and the second interface, and a second communication path which couples the third interface and the fourth interface, in an ordinary state;
- cutting off a third communication path which couples the first interface and the third interface in an ordinary state;
- forming the third communication path when data needs to be write from the high-rank unit to the low-rank unit; and
- cutting off the first communication path and the second communication path when data needs to be write from the high-rank unit to the low-rank unit.

* * * * *